United States Patent [19]
Copp et al.

[11] Patent Number: 5,159,998
[45] Date of Patent: Nov. 3, 1992

[54] UNISPRING DRUM BRAKE ASSEMBLY

[75] Inventors: Douglas M. Copp, West Milton; Robert W. Hyde; Frank W. Brooks, Sr., both of Dayton; Gary G. Holliday, Vandalia; Michael W. Fanelli, Centerville, all of Ohio

[73] Assignee: General Motors Corporation, Detroit, Mich.

[21] Appl. No.: 739,148

[22] Filed: Aug. 2, 1991

[51] Int. Cl.⁵ ............................................. F16D 51/26
[52] U.S. Cl. ................................... 188/340; 188/216; 188/328; 188/341
[58] Field of Search ............... 188/328, 216, 340, 341, 188/331, 329, 206 A, 250 A, 250 F, 330, 206 R

[56] References Cited
U.S. PATENT DOCUMENTS

| | | | |
|---|---|---|---|
| 2,642,159 | 6/1953 | House | 188/329 |
| 3,095,950 | 7/1963 | Scheel | 188/216 X |
| 3,203,512 | 8/1965 | Lepelletier | 188/331 X |
| 4,130,189 | 12/1978 | Katagiri et al. | 188/328 |
| 4,494,633 | 1/1985 | Idesawa | 188/330 X |
| 4,762,209 | 8/1988 | Copp | 188/340 X |
| 4,993,525 | 2/1991 | Hyde | 188/216 X |
| 4,998,602 | 3/1991 | Yamamoto | 188/340 X |

*Primary Examiner*—Douglas C. Butler
*Attorney, Agent, or Firm*—Ernest E. Helms

[57] ABSTRACT

A drum brake is provided of the leading-trailing shoe type in which a single piece spring installed as a part of the assembly holds down the brake shoe assemblies against the backing plate and also retracts the shoes after brake actuation. The single piece spring also retains the lower ends of the shoes against the anchor plate. This arrangement eliminates the need for separate shoe hold-down springs and separate upper and lower return springs, resulting in a significant reduction in parts and labor for assembly.

6 Claims, 5 Drawing Sheets

UNISPRING DRUM BRAKE ASSEMBLY

FIELD OF THE INVENTION

The invention relates to a drum brake assembly of the leading-trailing shoe type in which a single-piece spring installed as a part of the assembly holds down the brake shoe assemblies against the backing plate and also retracts the shoes after brake actuation. The single piece spring also retains the lower ends of the shoes against the anchor plate. This arrangement eliminates the need for separate shoe hold-down springs and separate upper and lower return springs, resulting in a significant reduction in parts and labor for assembly. Such a drum brake assembly is illustrated in Copp U.S. Pat. No. 4,762,209 commonly assigned.

There are two design criteria which are very important in the utilization of drum brake assemblies with unisprings. The first criteria is that the shape of the spring should be made as simple as possible and there should be an avoidance of spring bends with tight radiuses. Secondly, the spring and its associated lever anchor should be carefully designed such that the hold-down force exerted on the brake shoes are equal and balanced with one another.

DISCLOSURE STATEMENT

The present invention provides a leading-trailing unispring drum brake assembly which is an alternative to that provided in the aforementioned Copp and provides a drum brake shoe assembly which maximize the above reference criterias.

DETAILED DESCRIPTION OF THE DRAWINGS

Figure 1:
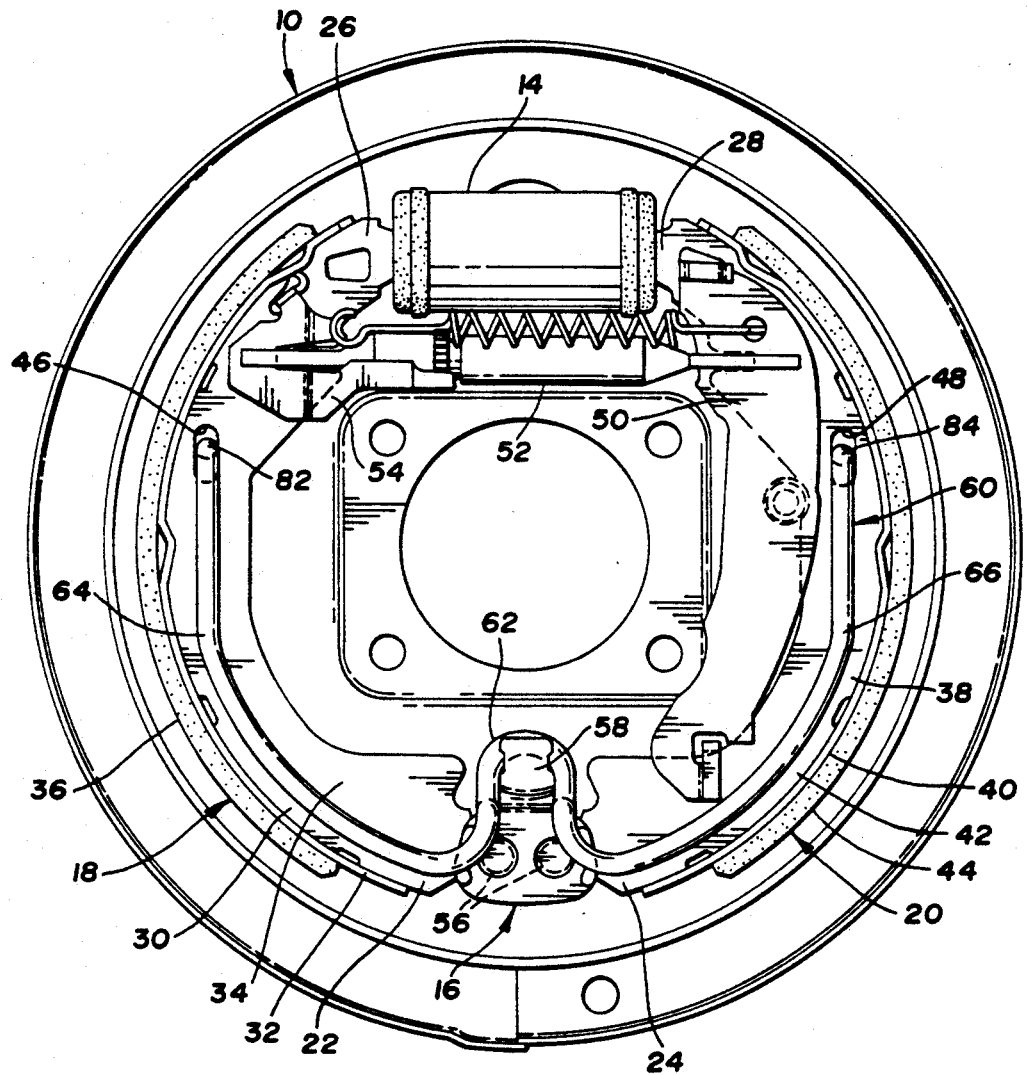
FIG. 1 is a side elevational view of the drum brake assembly embodying the invention.

The drum brake assembly 10 includes a backing plate 12 having mounted thereon a wheel cylinder 14 and an anchor 16 circumferentially opposite the wheel cylinder. A pair of brake shoe assemblies 18 and 20 are also mounted on the backing plate. The shoe assemblies respectively have adjacent ends 22 and 24 engaging the anchor 16 and another set of adjacent ends 26 and 28 engaging the wheel cylinder for actuation. Shoe assembly 18 includes the shoe 30, formed by shoe rim 32 and shoe web 34, and the brake lining 36 mounted on the shoe rim. Shoe assembly 20 includes the shoe 38, formed by rim 40 and 42, and the brake lining 44 mounted rim 40. Shoe web 34 has a sot 46 formed therethrough immediately adjacent the rim 32 and positioned somewhat nearer the wheel cylinder 14 than the anchor 16. Similarly, shoe web 42 has a slot 48 formed therein and similarly positioned. The particular drum brake assembly 10 illustrated in one which also has an arrangement for mechanical actuation for parking brake purposes. Therefore the parking brake arm 50 is mounted on web 42 of shoe assembly 20 so as to be actuated as is well known in the art. For this purpose the spreader strut 52 is connected with shoe assembly 20 and engageable by arm 50 for such actuation. Spreader strut 52 is also engaged with the web 34 of shoe assembly 18. A suitable adjuster mechanism 54 is also provided as a part of the shoe assembly 18 and the spreader strut 52. Anchor 16 is suitably secured to the backing plate 12 by rivets 56, for example, and has a lower body portion joined to a tongue or tab-like portion 58 extending therefrom toward wheel cylinder 14 and spaced laterally from the backing plate 12. The tongue portion 58 may also function as a parking brake actuating cable support. However, the parking brake actuating cable is not illustrated.

The spring 60 is a U-shaped brake shoe return and hold-down spring which when installed provides all of the functions of shoe hold-down springs and shoe retracting springs. Spring 60 has a center loop section 62, a first spring arm 64 and a second spring arm 66 extending from the center loop section. The center loop section has loop arms 68 and 70 which respectively connect with spring arms 64 and 66 so that the loop arms extend toward the backing plate. The loop arms 68 and 70 are connected by a loop back section 76 which when installed in the drum brake assembly extends generally parallel to the basic plane of the backing plate 12. The loop arms 68 and 70 are connected to spring arms 64 and 66 so that each spring arm extends in generally arcuate opposed directions from the center loop section 62.

Figure 2:
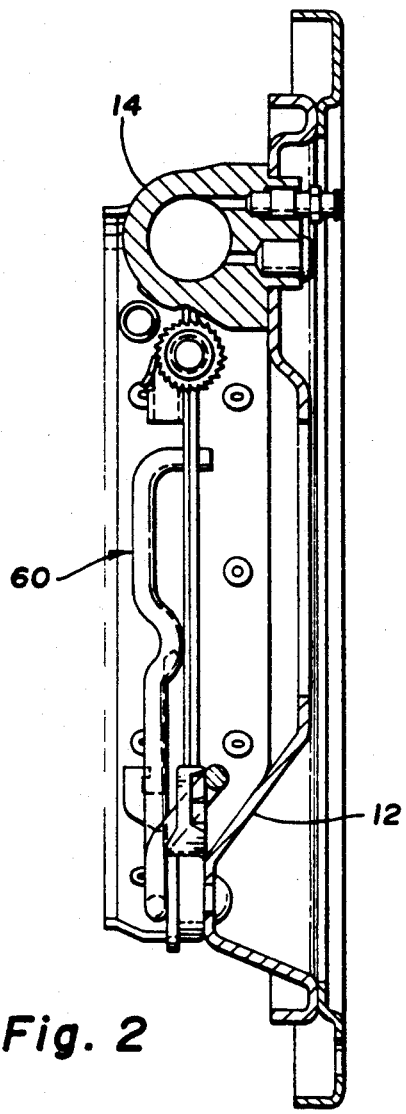
FIG. 2 is a fragmentary cross-section view taken in the direction of arrows 2—2 of FIG. 1.
Figure 3B:
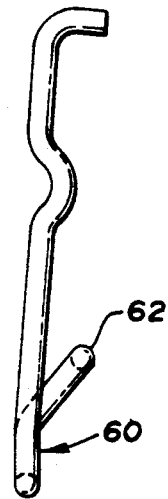
FIG. 3B is a side elevational view of the spring in a free state before installation.
Figure 3A:
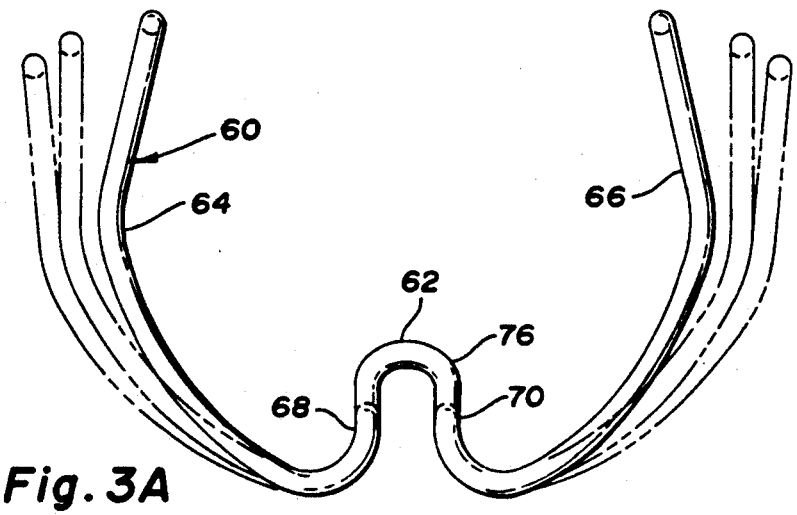
FIG. 3A is a front elevational view of the single-piece spring of the invention.

The drum brake is assembled by placing the shoe assemblies 18 and 20 in position so that their ends engage the wheel cylinder 14 and anchor 16 as shown with strut 52 and adjuster mechanism in place. The spring 60 is then placed in position by first positioning the center loop section 62 over the anchor tab section 58 as shown and moving the spring downwardly to seat the loop section on the anchor. The spring hooked ends 82 and 84 are then inserted into the slots 46 and 48. This action causes spring force to be exerted on the shoes toward the backing plate with the center loop section 62, and particularly the loop back 76 and loop arms 68 and 70, exerting a spring reaction force on the anchor 16. The spring arms 64 and 66 had to be spread apart to some extent in order to insert their hooked ends in the slots and therefore the spring arms also exert forces urging the shoe assemblies 18 and 20 toward the retracted position shown. Due to the particular arrangement of the center loop section 62 of the spring, as well as the various bends, the spring also exerts a force on each shoe assembly continually urging that shoe assembly toward the backing plate 12 as above noted. Thus the spring performs the function of hold-down springs which have been commonly provided for each shoe assembly, as well as retraction springs which in a leading-trailing brake shoe assembly are normally provided adjacent the upper shoe ends 26 and 28 and also the lower shoe ends 22 and 24. The slots 46 and 48 are so located in the shoe webs, and the spring arms 64 and 66 are of such a length, that the retraction force of the spring is exerted on the shoes to continually urge the shoe ends into engagement with the wheel cylinder and the anchor. Furthermore, the positioning of the portions of the spring arms 64 and 66 adjacent their bends 78 and 80 provide some security against the shoe ends 22 and 24 being removed laterally from the anchor at any time. This action is further enforced by the engagement of the spring arm portions 90 and 92 with the outer side of the shoe webs 34 and 42, as is better shown in FIG. 2.

This arrangement provides for a quick assembly operation by employing a single spring instead of the assembly of at least four springs in the typical leading-trailing brake shoe assembly, with the single spring performing all the functions of the previous four. The spring is quickly removed and replaced at any time that the shoes are required to be removed and replaced.

Figure 4:
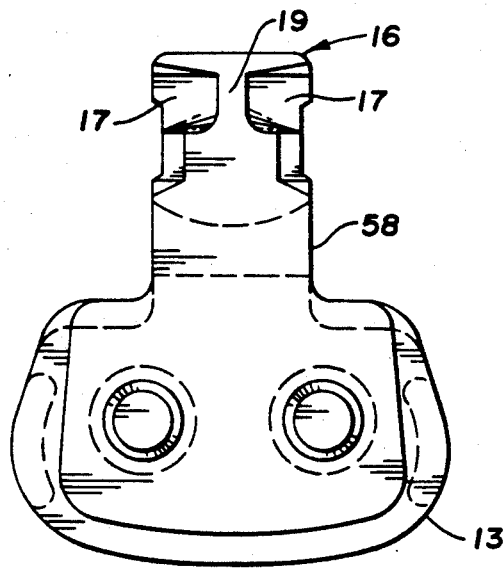
FIGS. 4, 5 and 6 are front, side and rear elevational views, respectively, of an anchor utilized in the drum brake assembly of the present invention.
Figure 5:
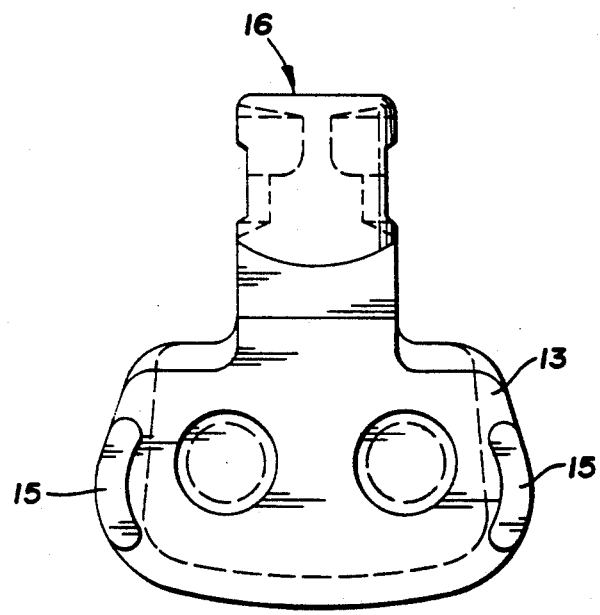
Figure 6:
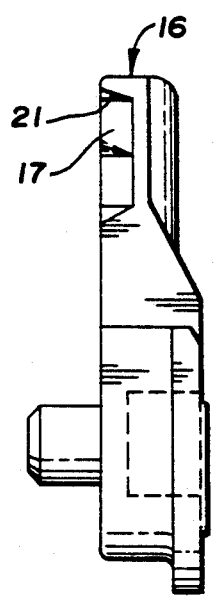
Figure 7:
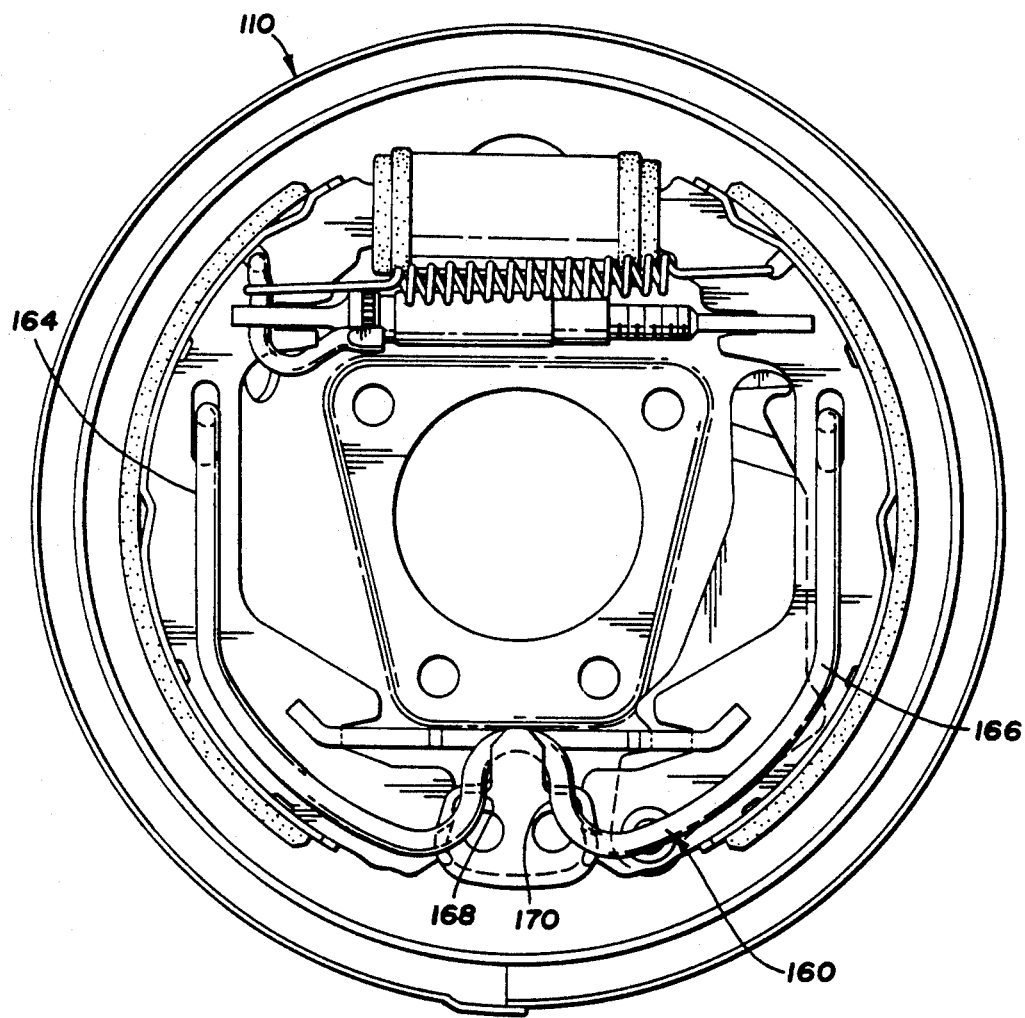
FIGS. 7, 8, 9, 10 and 11 illustrate an alternative preferred embodiment of the present invention to that shown in FIGS. 1–6 views similar to FIGS. 1, 2, 4, 5 and 6.
Figure 8:
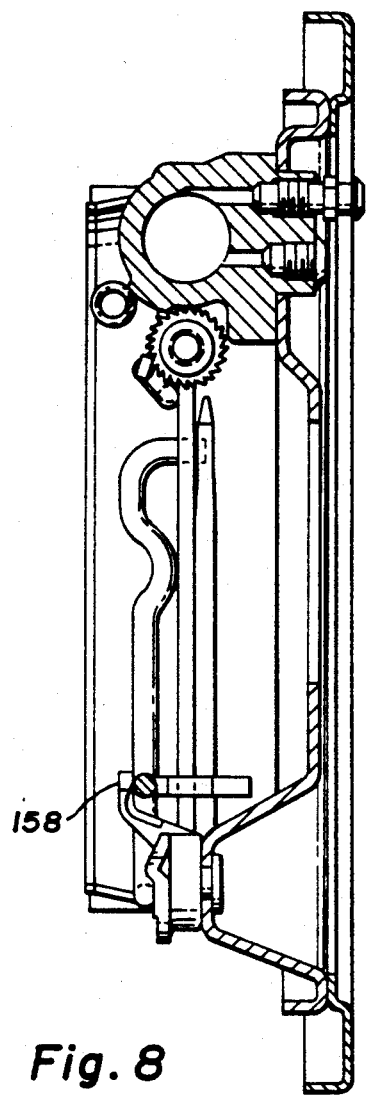
Figure 9:
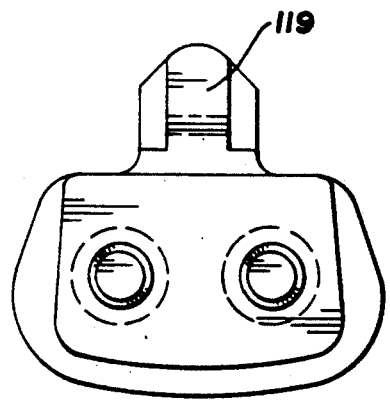
Figure 10:
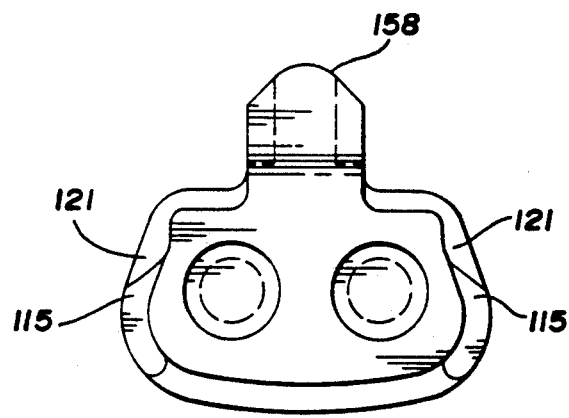
Figure 11:
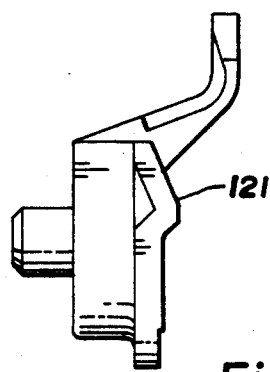

Referring additionally to FIGS. 4, 5 and 6, the anchor utilized in the drum brake assembly has a lower body portion 13 with a connected tab 58 which extends towards the wheel cylinder 14. On the side of the anchor 16 facing away from the backing plate 12, spaced apart from one another along the edges of the lower body portion 13 are two alpha kidney-shaped location isolation pads or surfaces 15 (sometimes referred to as locator surfaces). When installed the loop arms 68 and 70 will contact with the kidney surfaces 15 and will be isolated from contact with the remainder of the anchor 16 on the side of the anchor facing away from the backing plate 12.

On the side of the anchor 16 facing towards the backing plate 12 the tab 58 has milled or stamped thereon two grooves 17 which form a peak providing a beta isolation surface 19 between them. Additionally, a top upper edge of the grooves 17 provide retaining surfaces 21 which keep the center loop section 62 of the spring from moving upward thereby retaining the spring 60 on the anchor 16. The grooves 17 of the tab cause the center loop section 62 of the spring to essentially have almost single-point contact with the tab along the beta surface 19. In similar fashion the kidney surfaces 15 cause the loop arms 68 to have almost single-point contact with the lower portion 13 of anchor 16.

The three-point contact ensures that the spring force exerted upon the two shoes assemblies 18 and are equal. Equal spring force application is especially critical when considering the hold down function of the spring 60. With the three-point contact which is provided by the anchor the locations of the contact between the anchor 16 and spring 60 is constantly predictable. In many prior designs a flat surface of the unispring was allowed to mate with the flat surface of the anchor. Since most flat surfaces provided in brake assemblies are subject to irregularities due to manufacturing and other tolerancing errors, the exact contact point between the two mating contact surfaces was often unpredictable. The prior arrangement led to the unispring exerting uneven hold-down forces upon the brake shoe assemblies. However, by providing exclusive contact along the beta and alpha isolation surfaces the location of contact between the spring and anchor is always predictable and the hold-down force exerted by the spring will essentially always be equal.

Referring to FIGS. 7 through 11, an alternate preferred embodiment 110 of the present invention is provided. In the alternate preferred embodiment the spring 160 has loop arms 164, 166 and loop arms 168, 170 are essentially coplanar. The present design is easier to fabricate due to fewer bends. The tab 158 has a portion which not only extends towards the wheel cylinder 114 but also extends outwardly away from the backing plate 112. The beta isolation surface 119 is formed similar to that previously described and also for the alpha isolation surfaces 115. However, above the alpha isolation surfaces are two raised corners 121. The raised corners act upon the lower part of the loop arms 164, 166 to prevent the spring 160 from being displaced upwardly.

While a few of the embodiments of the present invention have been explained, it will be really apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A drum brake comprising:
a backing plate having mounted thereon a wheel cylinder, a pair of brake shoe assemblies having a first set of engaging ends engaging the wheel cylinder for actuation, each of the brake shoe assemblies including a shoe web having a slot formed therein, and a single generally U-shaped spring combining functions of shoe hold-down and shoe retracting spring and shoe guide means, the single spring having a center loop section and first and second spring arms extending from the center loop section, the center loop section having loop arms connecting with the first and second spring arms in bent relation and the center loop section having a loop back section connecting the loop arms, the spring arms extending in bent relationship from the loop arms in general arcuate opposed directions and having hooked ends received in the shoe-web slots in spring loaded relationship, the spring arms providing shoe-web guides keeping the shoe webs in guided relation, the spring being spring loaded so as to continually urge the brake assemblies towards the retracted position and also in resilient hold-down position against the backing plate, and;
an anchor fixably connected with the backing plate circumferentially opposite the wheel cylinder wherein a second set of adjacent shoe ends engage the anchor, the anchor having a lower body portion and the anchor having connected to and extending from the lower body portion a tab-like portion extending towards the wheel cylinder in spaced relation to the backing plate, the loop back section of the spring being positioned between the anchor tab-like portion and the backing plate with the anchor tab-like portion being engaged by the loop back section of the spring and providing spring reaction to spring force exerted thereon in a direction away from the backing plate for a shoe hold-down, the spring arms bring a spring force engaging relationship with the lower body portion of the anchor on a side of the lower body portion thereof opposite the backing plate with the spring force exerted on the anchor by the loop arms being in a direction towards the backing plate, and wherein the anchor lower body portion having on a side away from the backing plate two spaced alpha locator pads for isolating the spring from contact with a remainder of the anchor lower body portion and the anchor on the side of the tab-like portion towards the backing plate having a beta locator isolation surface for contact with the spring loop back section wherein when installed the spring makes three-point contact with the beta locator isolation surface and the lower body portion alpha locator pads.

2. A drum brake assembly as described in claim 1 wherein said tab-like portion has retainer surfaces forcing contact with said spring loop back section to prevent said spring from coming off of said tab-like portion.

3. A brake assembly as described in claim 1 wherein said alpha locator pads are generally kidney-shaped members spaced apart along the edge surfaces of the lower body portions of said anchor.

4. A brake assembly as described in claim 2 wherein the beta locator isolation surface and the retainer surfaces are formed on the tab-like portion by having inclined grooves formed on the tab-like portion forming a peak therebetween providing the beta isolation surface and upper edges of the grooves forming the retainer surfaces.

5. A drum brake assembly as described in claim 1 wherein said tab-like portion is displaced from said lower body portion in a direction away from said backing plate.

6. A drum brake assembly as described in claim 1 wherein said lower body portion has retaining corners.

* * * * *